US006441834B1

(12) United States Patent
Agassi et al.

(10) Patent No.: US 6,441,834 B1
(45) Date of Patent: Aug. 27, 2002

(54) HYPER-RELATIONAL CORRELATION SERVER

(75) Inventors: Shai Agassi, Los Gatos, CA (US); Gilad Paran-Nissani; Udi Ziv, both of Ra'anana (IL)

(73) Assignee: SAP Portals, Inc., San Jose, CA (US)

( * ) Notice: Subject to any disclaimer, the term of this patent is extended or adjusted under 35 U.S.C. 154(b) by 0 days.

(21) Appl. No.: 09/289,478

(22) Filed: Mar. 25, 1999

Related U.S. Application Data

(60) Provisional application No. 60/079,583, filed on Mar. 26, 1998.

(51) Int. Cl.[7] .................................................. G06F 3/00
(52) U.S. Cl. ...................... 345/764; 345/853; 345/854; 709/329; 709/331
(58) Field of Search ................................ 345/348, 356, 345/339, 357, 968, 764, 853, 854; 707/101, 102, 103; 709/329, 331, 332

(56) References Cited

U.S. PATENT DOCUMENTS

| 5,848,424 | A | * | 12/1998 | Scheinkman et al. | ....... 707/501 |
|---|---|---|---|---|---|
| 5,862,325 | A | * | 1/1999 | Reed et al. | ................. 707/201 |
| 5,873,102 | A | * | 2/1999 | Bridge, Jr. et al. | ......... 707/204 |
| 6,002,402 | A | * | 12/1999 | Schacher | .................... 345/352 |
| 6,014,670 | A | * | 1/2000 | Zamanian et al. | .......... 707/101 |
| 6,128,621 | A | * | 10/2000 | Weisz | ......................... 707/103 |
| 6,202,099 | B1 | * | 3/2001 | Gillies et al. | ............... 709/317 |
| 6,233,578 | B1 | * | 5/2001 | Machihara et al. | ........... 707/10 |

* cited by examiner

Primary Examiner—Raymond J. Bayerl
Assistant Examiner—Cuong T. Thai
(74) Attorney, Agent, or Firm—Townsend and Townsend and Crew LLP; Philip H. Albert, Esq.; Fidel D. Nwamu, Esq.

(57) ABSTRACT

A correlation server provides for links between disparate data structures in a hyper-relational data navigation system. In one hyper-relational navigation system, a correlation server is used to provide a relationship between a component in one data structure and a component in another data structure. In one method, a draggable element and a drop target are identified. Metadata is imported into a class-relation matrix maintained for the first data structure and a response to a navigation action is formulated, wherein the response is dependent upon at least the draggable element, the drop target and a cell in the class-relation matrix that corresponds to the draggable element and the drop target and includes imported metadata.

4 Claims, 6 Drawing Sheets

HYPER-RELATIONAL CORRELATION SERVER

CROSS-REFERENCES TO RELATED APPLICATIONS

This application claims priority from U.S. Provisional Application No. 60/079,583, filed Mar. 26, 1998 pending, the disclosure of which is incorporated herein by reference for all purposes.

BACKGROUND OF THE INVENTION

The present invention relates to the field of user interfaces in general and more particularly to navigation interfaces for navigating large data structures interactively. As described in Scheinkman (U.S. Pat. No. 5,848,424 assigned to the assignee of the present application and incorporated herein by reference for all purposes), a browser can display hypertext pages and indicate draggable elements on the hypertext page being viewed. A browser can also display target components and allow its user to drag page elements onto target components. The browser and/or server (to which the browser is connected) then perform an action, which is a function of both the dragged element and the drop target. Usually this action involves getting data from a database, processing that data and displaying the result. The details of the action—what data to get, what processing to do—are determined by the user's choice of dragged element and drop target.

SUMMARY OF THE INVENTION

In one embodiment of a hyper-relational navigation system according to the present invention, a correlation server is used to provide a relationship between a component in one data structure and a component in another data structure. In one method, a draggable element and a drop target are identified. Metadata is imported into a class-relation matrix maintained for the first data structure and a response to a navigation action is formulated, wherein the response is dependent upon at least the draggable element, the drop target and a cell in the class-relation matrix that corresponds to the draggable element and the drop target and includes imported metadata.

BRIEF DESCRIPTION OF THE DRAWINGS

FIG. 5 is a set of screen shots of a correlation program.

DESCRIPTION OF THE SPECIFIC EMBODIMENTS

Hyper-relational correlation (HRC) is a process used typically in connection with hyper-relational navigation (HRN), to be used for a "drag and relate" operation and "click and relate" operation, or the like. With HRC, a user may navigate between several different systems, each possibly (though not necessarily) residing on a different computer, accessing data from disparate sources, using different computational components, and possibly belonging to a different organization. The navigation is seamless, in the sense that the user may drag and relate, or click and relate, data across computational boundaries, as the dragged element and the target component may belong to entirely different systems.

Consider two HRN systems. Each of these systems may reside on a different computer, in a different organization, in a different geographical location. The user views each system by viewing its components through a browser. The user navigates within each system by using a mouse: clicking links or dragging links onto targets displayed in the toolbar. Each system responds by examining the dragged element and the receiving target, and providing a result that is a function of both. In one embodiment, this functionality is provided by a system that looks up a class-relation matrix, in order to determine the appropriate function of both and responds accordingly.

In a more general model, it is desirable that the user may drag elements from one system onto a target in the other system. The target system should respond by looking up the remote element in a class-relation matrix, and providing the appropriate result.

Figure 1:
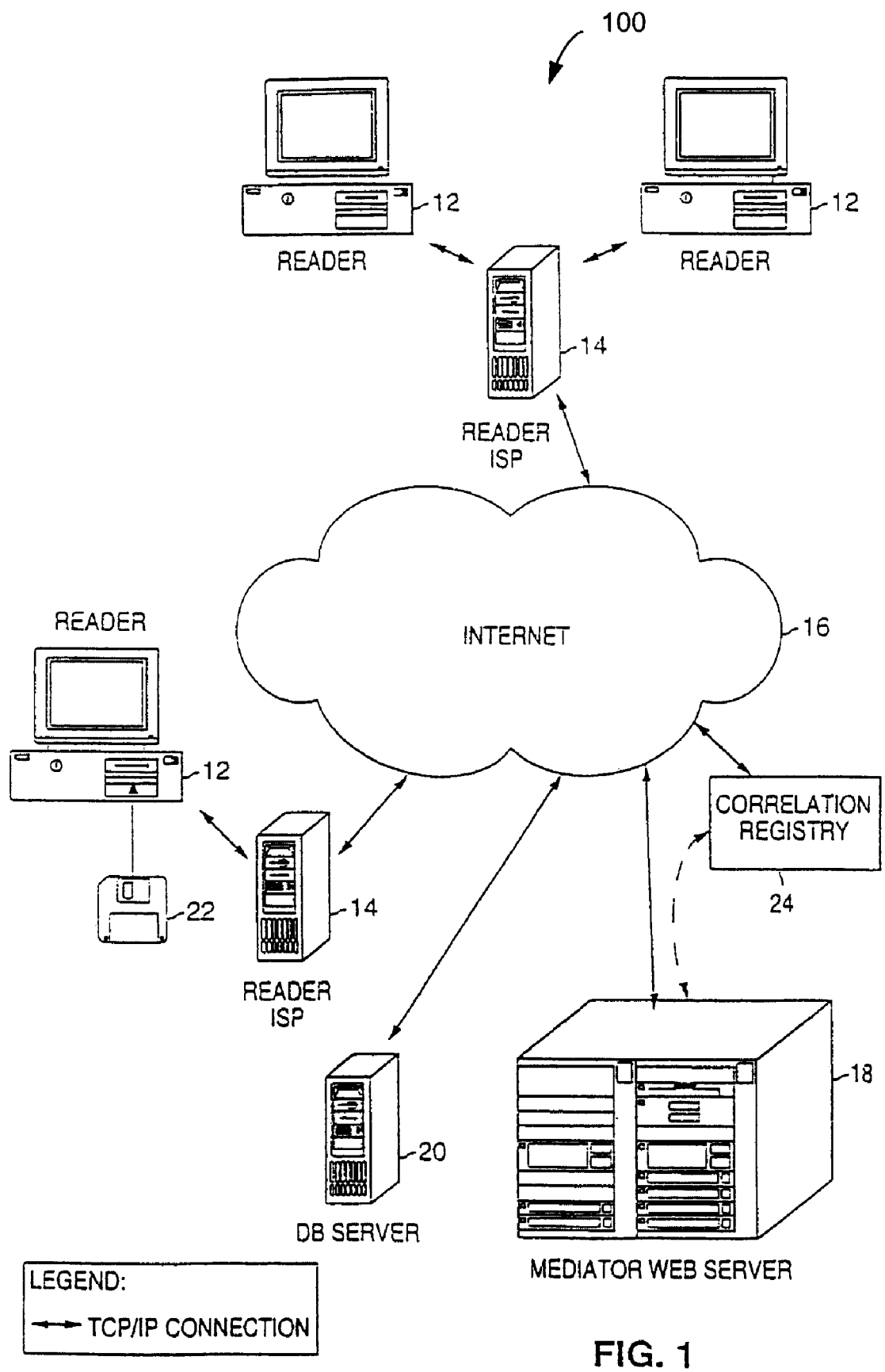
FIG. 1 is a block diagram of a networked computer system over which the present invention might operate.

FIG. 1 is a block diagram of a network over which an embodiment of a hyper relational correlation system according to the present invention might operate. To access content, a reader 12 connects to a reader ISP (Internet Service Provider) 14, which in turn connects reader 12 to the Internet 16 as is well known in the art. Other network connections are also possible. Also shown connected to Internet 16 in addition to readers 12 and reader ISP's 14, are a Web server 18, which is a "Mediator-enabled." Where a server is modified to respond correctly to Know protocol messages sent by a Mediator-enabled browser, the server is said to be a "Mediator-enabled" server. The Know protocol is a description protocol "Know" protocol, which is transparent to the user. It allows web links to describe the data which contains the link, in contrast to usual protocols which describe the data to which the link is pointing. A Mediator-enabled browser is capable of operating as an ordinary browser when encountering an ordinary Web site, but as the user points the browser towards Web server 18 (or any other Mediator-enabled Web server), the browser connects to Web server 18 and can communicate using Know protocol messages.

Other components of the network 100 are a database (DB) server 20, readers 12 are also referred to herein as "browsers" because they can be used by a user to browse the Web. Of course, readers 12 could also be machines totally controlled by programs acting as users as opposed to being controlled by human users. One reader 12 is shown with a client-side program 22 loaded thereon from a magnetic media. Client-side program 22 provides the novel functionality described below. Although not shown, readers 12 include graphical displays and input devices such as a mouse and/or keyboard. As is well known in the art of user interfaces, the input devices can be used to manipulate a cursor, such as a mouse cursor, on the graphical display to select screen elements.

Figure 2:
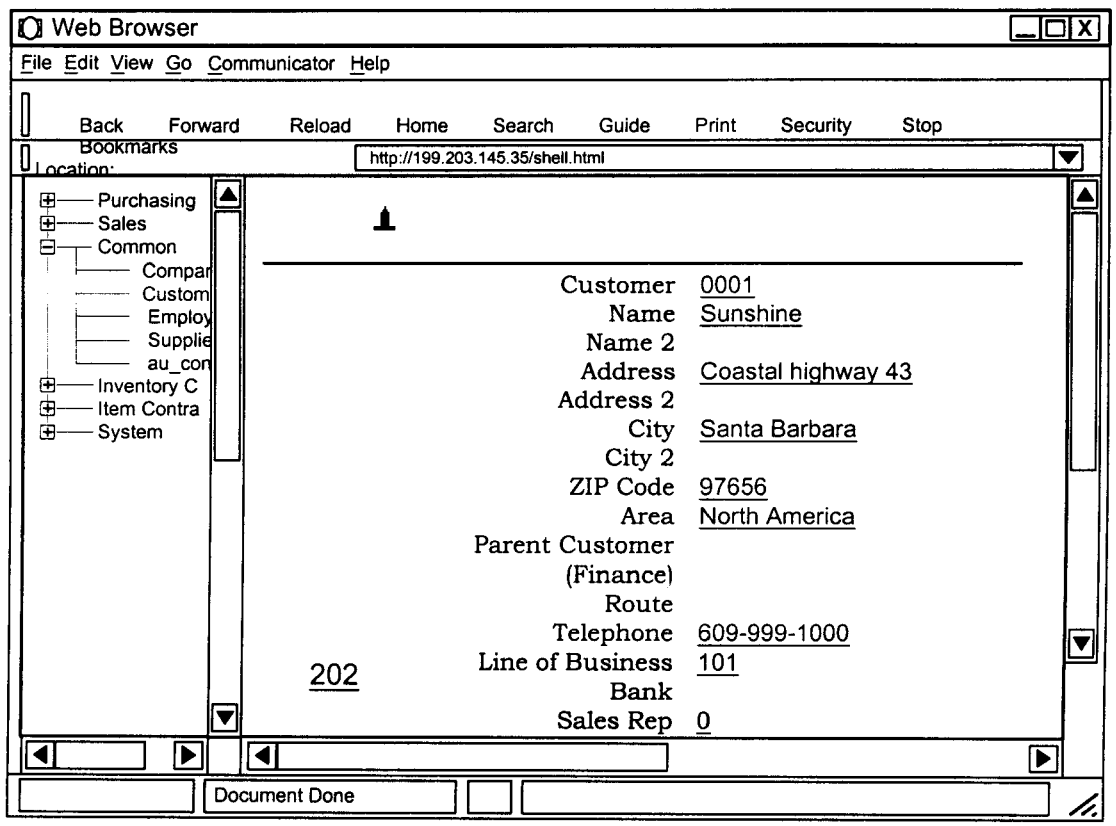
FIG. 2 is a screen shot of a display of two different data structures.
Figure 2:
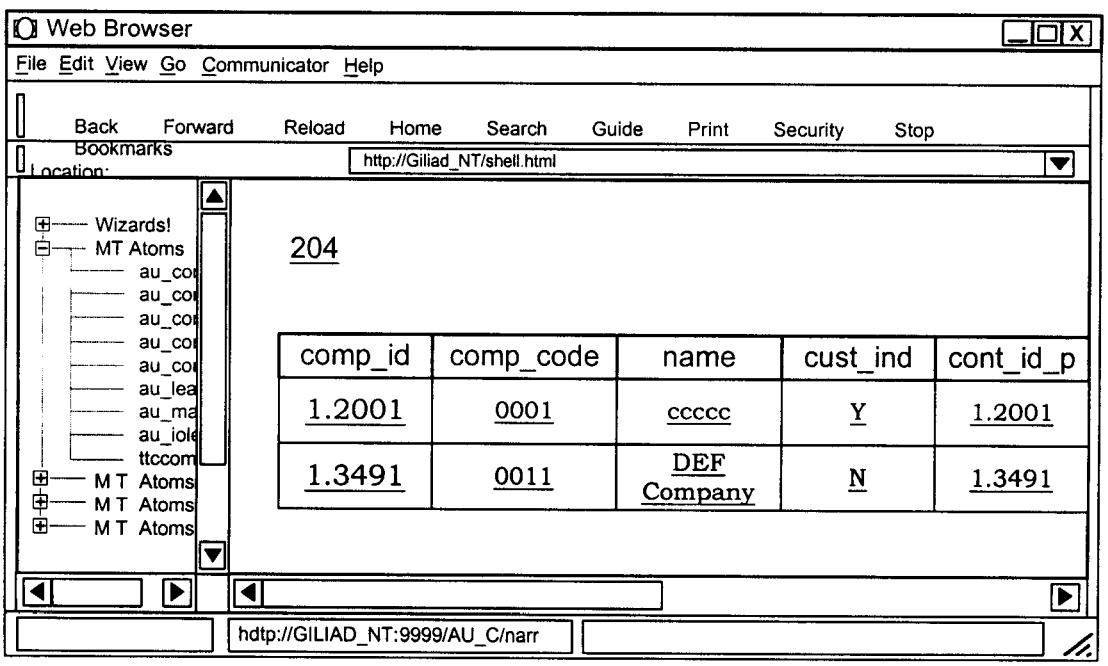

FIG. 2 shows an example application for browsing two systems using two windows; on the top, a window 202 for browsing, order and inventory control system; and on the top right, a window 204 for browsing a different department's sales-contact information. The user wishes to know the name of the customer for a particular contact (in this case "CCCCC") using window 204. The element "CCCCC" is being dragged upon the component Customers 206 in window 202, with the result that the appropriate customer is displayed in window 202.

In a still more general model, one system may select several of the components in the other system, to display in its toolbar. The user could then use a single browser window, instead of the two above, to navigate both systems. The user would have access to components from both systems in a single toolbar.

In a still more general model, a third party would integrate the two systems by setting up its own, third, system. It would display components from the two systems in its own toolbar. The user would access the third party's system, and have access to the two original systems in a single toolbar. The administration of this third toolbar would be done by the third party, so the two original systems are integrated without requiring administration resources from the original two parties.

Correlation of two systems is achieved by importing components from one system into the other. The import operation is done once, when setting up the correlation. This import operation only needs to fetch metadata about the imported components (such as their properties), so it does not necessarily copy masses of data such as database tables. Thus, the import operation would fetch information such as the name of a component, a list of its properties and any other information on its properties and members. Preferably, the import operation does not include fetching the actual values written in a database.

The import operation may fetch a single component, or as many as desired, from the remote system. The import operation may be done by a third party, which fetches as many components as wanted from the correlated systems. As mentioned before, HRN systems maintain a class-relation matrix. After import, the class-relation matrix of the importing system will contain the relations between the imported components and the local ones. These relations are set up once by the administrator of the system and may be subsequently edited as necessary. An auto-complete mechanism assists the administrator in setting up the class-relation matrix so that the administrator needs to set up only a few basic relations; the rest are completed automatically.

Once the import is done, users will be able to drag data elements belonging to the imported components onto local components in the receiving system.

One implementation of the import operation uses a correlation wizard provided to the administrator. This tool guides the administrator through a sequence of steps, until correlation is achieved. Screen shots of this tool are shown in FIGS. 5(a)–5(d).

A browser connects a user to each system and displays each system's components in a browser window. A "component file" can, using the present invention, describe components belonging to several different systems. In this way, for example, window 202 of the previous example may contain components belonging to both systems. An example of the component file is shown in Table 1.

TABLE 1

| Component # | Component Name | Server URL | Component URL | Icon | MainObj |
|---|---|---|---|---|---|
| 25012 | Customer | SysA:9999 | SysA:9999/Action/25012 | Icon25012 | CUST |
| 25013 | Company | SysA:9999 | SysB:9756/Action/26143 | Icon25013 | COMP |

The component file shown in Table 1 differs from the component file described in Scheinkman in several respects. One difference is that the second line describes a component that is not "native" to System A. The component-URL identifies it as belonging to System B. The server-URL still points to A, as the window 202 was created by System A, because system A "imported" the component from system B. Window 204 connects to System B, and will receive a component file containing components local to System B, as well as those imported to System B. An example of a component file for System B is shown in Table 2.

TABLE 2

| Component # | Component Name | Server URL | Component URL | Icon | MainObj |
|---|---|---|---|---|---|
| 26143 | Company | SysB:9756 | SysB:9756/Action/26143 | Icon26143 | COMP |
| 26152 | Customer | SysB:9756 | SysA:9999/Action/25012 | Icon25012 | CUST |

The result of loading these files is that the browser displays a toolbar, as described by Scheinkman. However these toolbars may now contain components from different systems. The above examples illustrate the case where system A imported "Company" from B, and system B imported "Customer" from system A. The import operation could be done on any components belonging to the respective systems, as well as additional systems not described here. Although the example shows two browser windows, a toolbar may contain components from several systems and the user might choose to work in a single browser window and still have access to those several systems. Alternatively, the user could open many windows and navigate among them.

Several possible scenarios are considered herein, illustrating various possible uses of the correlation server. This list of scenarios is not exhaustive, and other scenarios might be created from the same concepts. The most basic scenario is one of a user working with a browser and viewing two different systems (as shown in FIG. 2). The pages viewed by the user come from two server programs. Typically, each server runs on a different computer, is connected to a different data source and a different set of computational objects.

The user does a "drag and relate" operation by dragging a data element onto a target component or a "click and relate" operation by clicking a hyper-relational link. The browser responds by sending a message to the Server A. Scheinkrnan teaches the method by which the browser understands that it should send a message. This starts a sequence of events illustrated in FIG. 3.

Figure 3:
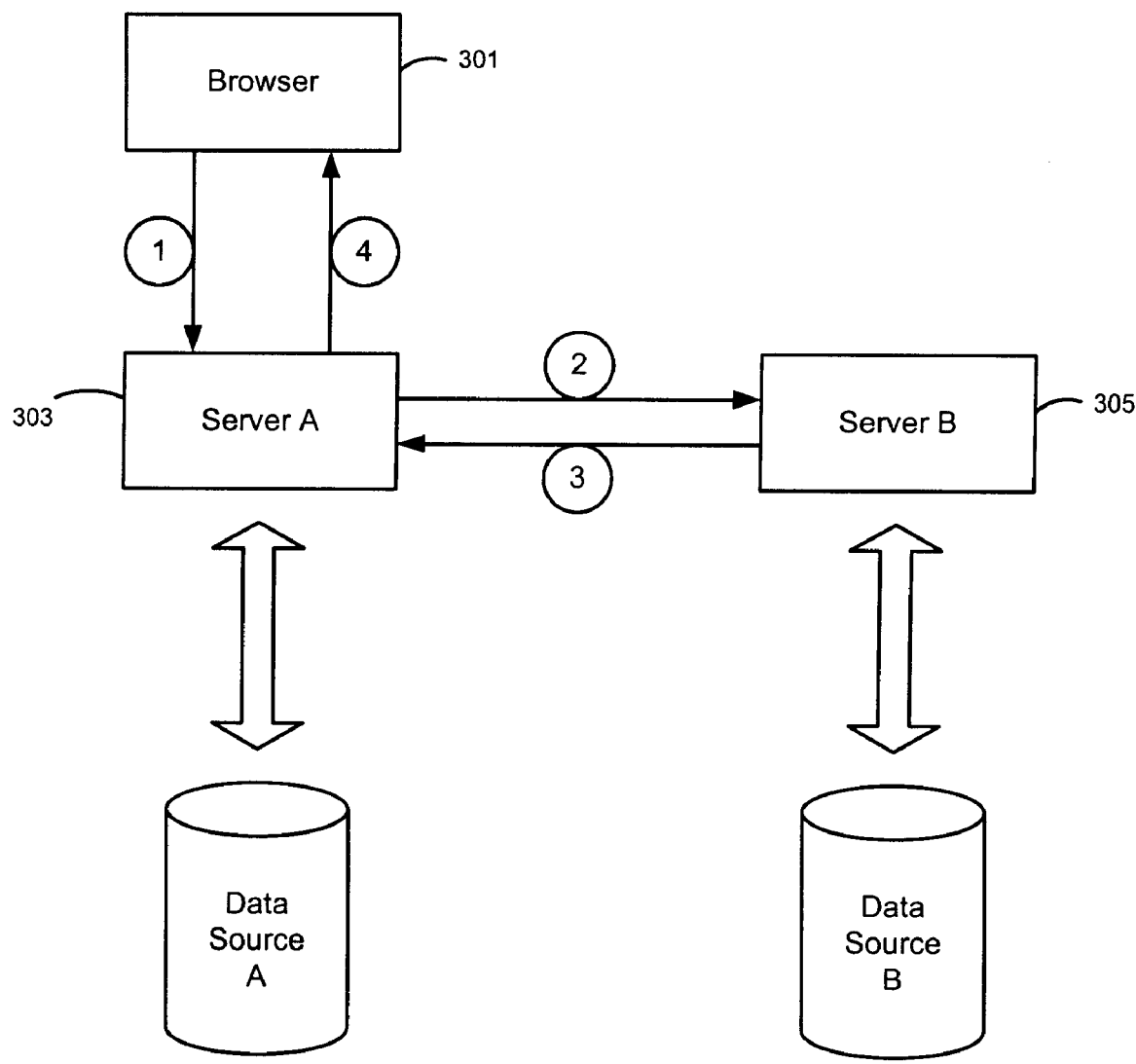
FIG. 3 is a block diagram of a system in which the operations shown in FIG. 2 are performed.

FIG. 3 is a block diagram of a system in which the operations shown in FIG. 2 are performed. In FIG. 3:

At step 1, a message is sent from the browser 301 to the Server A, 303, which owns the target component. This is an HRNP message, as described in Scheinkman, amended to include information on the several systems that own the dragged element and the target component. For example:

http://SysA:9999/HRNP$30000/SysA:9999/Action/25012<SysB:9756/COMP/name/ccccc

That HRNP message contains, in order, the URLs of the receiving server, the server that owns the target component, and the server that owns the dragged element.

At step 2, a message is sent from server A, 303, to server B, 305, which owns the dragged element. This is a request for data that will assist the system A in responding to the user's request. For example, the user may have dragged the name "CCCCC", but the system A requires an ID number in order to resolve request. Such a message may take the form http://SysB:9756/HRNP$30000/SysB:9756/Action/26143[-IDnum]<SysB:9756/COMP/name/cccc That HRNP message refers three times to system B, which is the destination of the message, the owner of the dragged element and the owner of the desired ID.

At step 3, the server B, 303, sends back the desired data (in the example, the desired IDs).

At step 4, the server A now has the information it needs to resolve the request. It accesses its local class-relation matrix, in order to determine what action is desired from the combination of the dragged element and the target component, and it produces the result, which is returned to the browser. In the example, server A, 302, would retrieve the list of customers that correspond to the Company IDs it has received from server B, 305, and then compose an HTML page and send it back to the requester.

A similar sequence of events occurs whether the user is working in two browser windows, or in one (with a toolbar comprised of components from both systems).

We now consider the case were a third party has set up a hyper-relational system with the intent of integrating the hyper-relational systems of some other parties (two or more). Such a third party may or may not have its own data source; in principal it may serve out the data of the integrated systems, and all it contributes is the integration effort (though it may also contribute its own data). An example of this is shown in FIG. 4.

Figure 4:
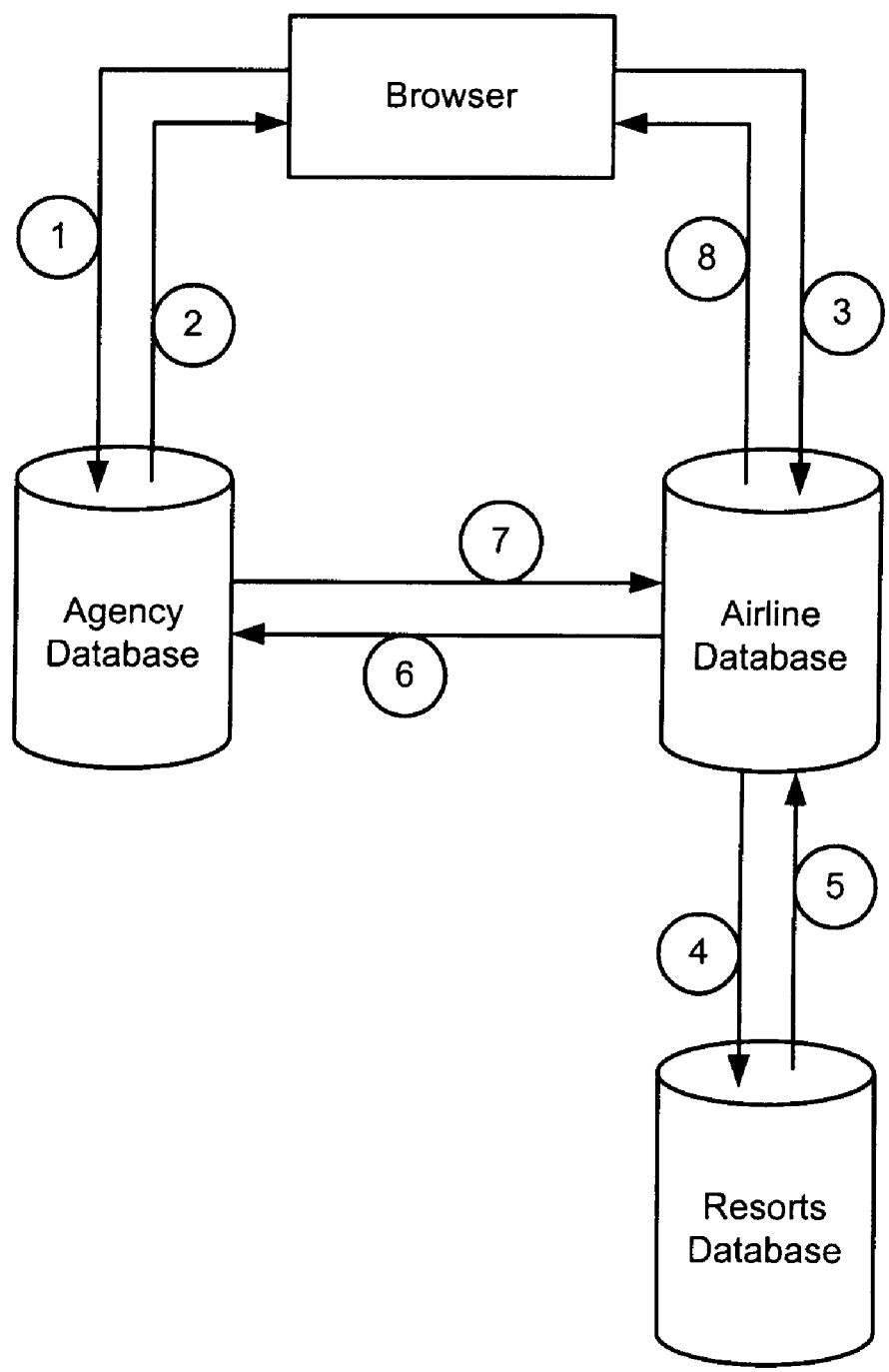
FIG. 4 is a block diagram illustrating the elements of a query operation.
Figure 5A:
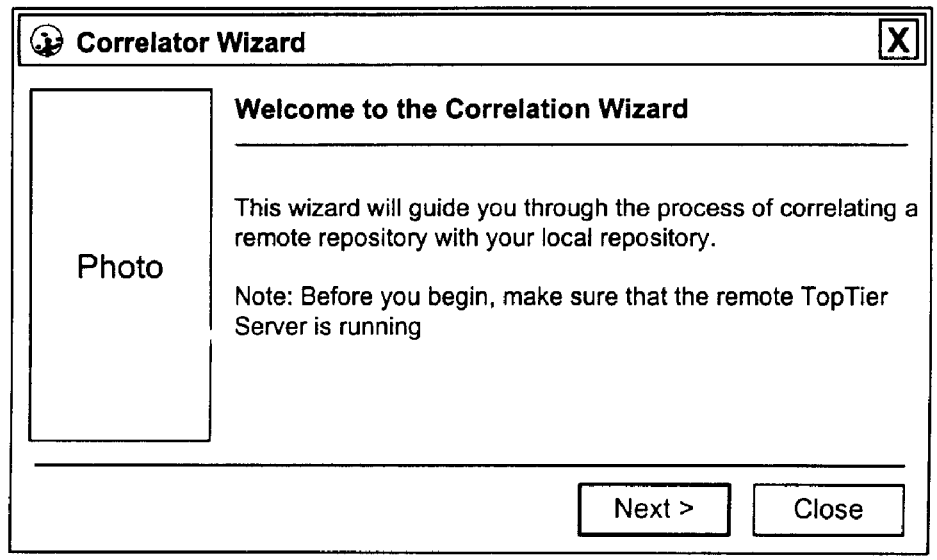
FIG. 5(a) shows an introductory dialog box.
Figure 5B:
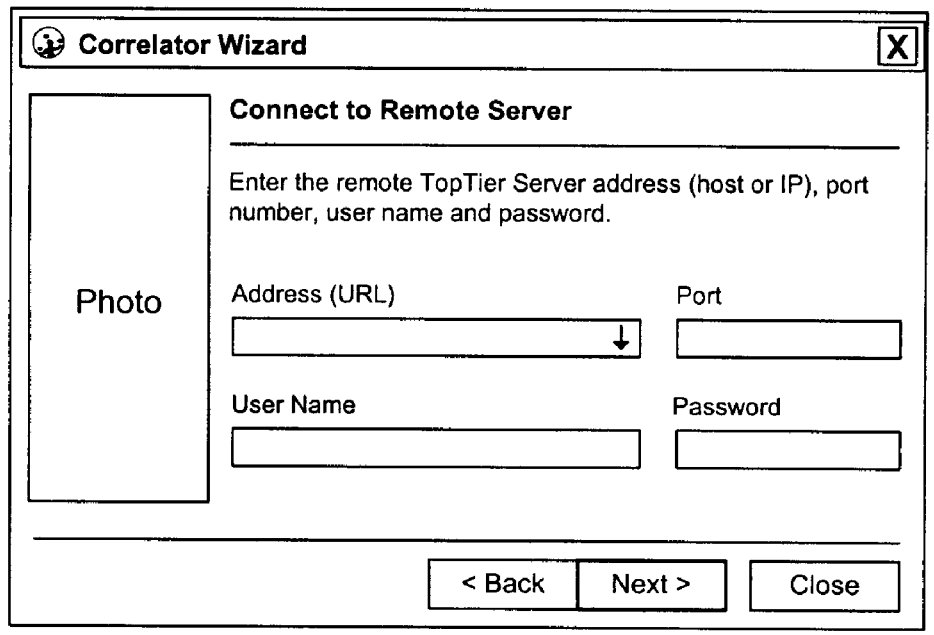
FIG. 5(b) shows a login dialog box.
Figure 5C:
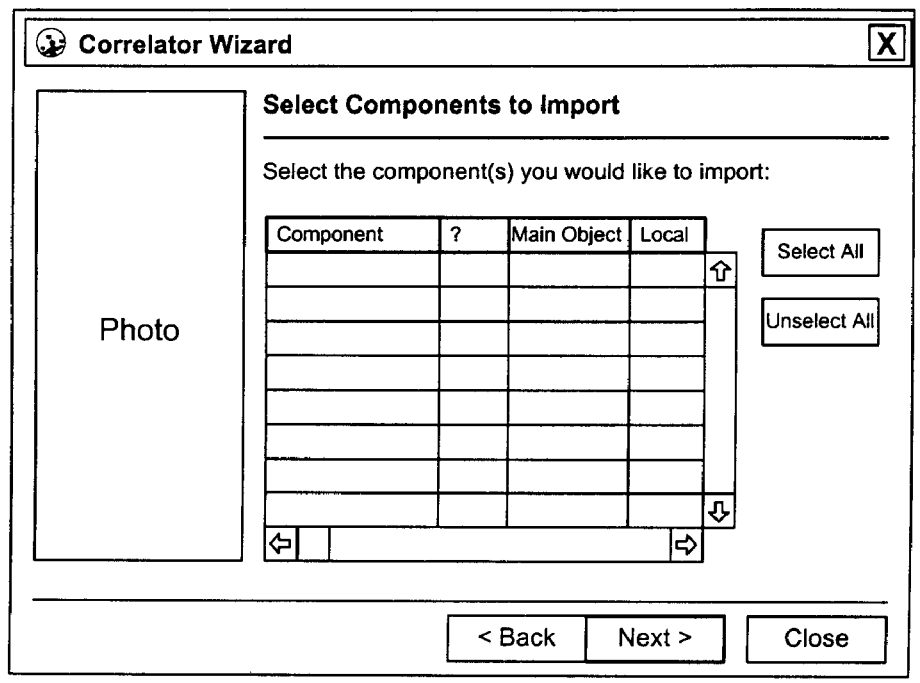
FIG. 5(c) shows a component selection dialog box.
Figure 5D:
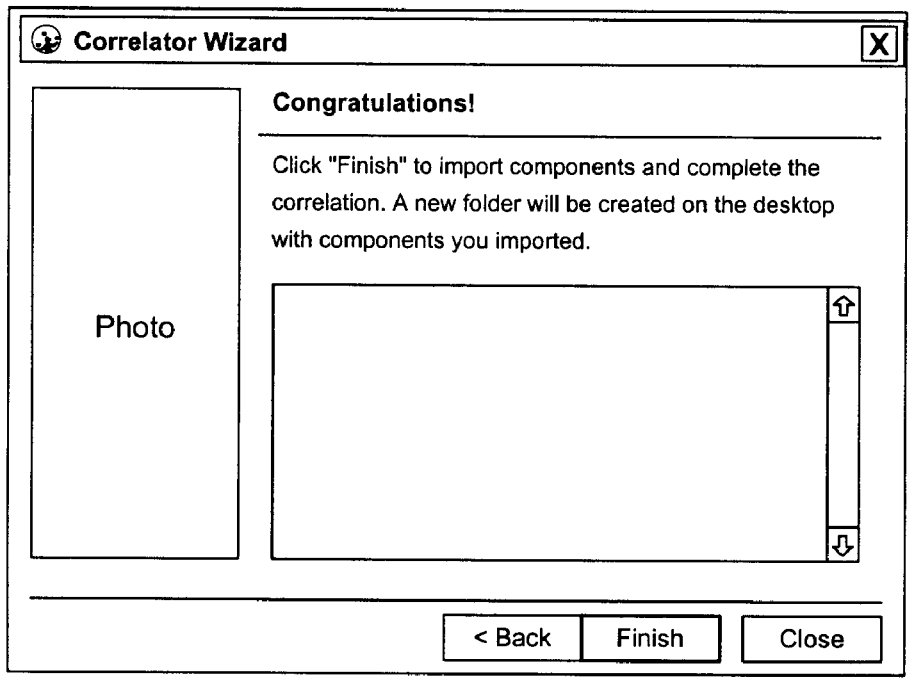
FIG. 5(d) shows a completion dialog box.

FIG. 4 is a block diagram illustrating the elements of a query.

An example application involves two "principal" parties, an airline and a resort chain, each with its own entirely separate system. A tourist agency takes upon itself the task of integrating these systems, by setting up a third system. Therefore, the toolbar created by the airline's server only contains its own components, as is true for the resort chain. The tourist agency's toolbar, however, only contains other systems' components. An example of a component file as might be supplied by the Agency's server to the browser is shown as Table 3.

TABLE 3

| Component name | Toolbar Server | Component URL |
| --- | --- | --- |
| Club | www.agency.com:9999 | www.club.com:9999/Component/25001 |
| Flight | www.agency.com:9999 | www.airline.com:9999/Component/25001 |

At step 1, a user's drag-and-relate operation would go to the Agency server sending a message, for example (step 1 in the following figure)

http://www.aqency.com.:9999/HRNP$30000
www.airline.com.:9999/Component/25001
<www.club.com:9999/MCLB/club_name/Itaparica The Agency server will now respond (step 2) by sending back to the browser the relation between the airline and resorts systems. This relation has been defined (by the Agency's administrator) in its class-relation matrix, between the components imported from the two systems.

The particular relation between the Airline and Resorts systems has been defined by the Agency for use in its own Web site, it is not imposed upon the Web sites of anybody else, and the Agency has not written anything into the private databases of the Airline or the Resorts systems. In principal, other third parties could define different relations, and the principals could also define a relation between them.

The response that the Agency sends back has the form www.airline.com:9999/component/25001
{relation}
<www.club.com:9999/MCLB/club_name/Itaparica so this contains the information of the original request from step 1, plus the relation defined by the Agency.

We now describe a particular example relation. The relation defined by the Agency involves a local Agency object, "Offices", which describes the offices of the Agency in countries around the world.

www.airline.com.9999/Component/25001
{www.club.com:9999/MCTY[25002]/County=
  www.agency.com:9999/OFFC[25003]/Country &
www.agency.com:9999/OFFC[25003]/City=
  www.airline.com:9999/AFLT[2500]/City}
www.club.com:9999/MCLB/club_name/Itaparica At step 3, the browser has received the Agency response, including the relation, and can now produce a request directly to the Airline server. This request will include the relation, and contains all the data that the Airline system needs to resolve the query, even though the Airline database does not contain any information on the Agency and its "private" relations. The request sent in step 3 is http://www.airline.com:9999/HRNP$30000
www.airline.com:9999/Component/25001
{www.club.com:9999/MCTY[25002]/Country=
  www.agency.com:9999/OFFC[25003]/Country &
www.agency.com:9999/OFFC[25003]/City=
  airline.com:9999/AFLT[25001]/City}
<www.club.com:9999/MCLB/club_name/Itaparica The Airline server is now responsible for resolving this request. The Airline server will produce the HTML document that will be returned to the browser. However, to resolve this request it must get assistance from other servers, such as the Club (Resorts) system (which tells the Airline server that Mexico is the country of Club Itaparica) and the Agency system (which gives the Airline server a list of all offices in Mexico). Once the Airline server has this supplementary information, it can resolve the query and produce an HTML page. At step 4, the Airline system begins with a request to the Resorts system. We have a club-name (Itaparica), and we want the country name (Mexico, which is the "Country" field of the MCTY object).

http://www.club.com:9999/Component/25002[-Country]
{0}
<www.clubmed.com:9999/MCLB/club_name/Itaparica Note that the syntax "[-Country]" means that the Resorts system is being asked to provide a list of country names (from the Country field in the database table). Details of the syntax of sending back the country names can be found below under the section entitled "HRNP Extensions for Correlation." At steps 6 and 7, the Airline system continues with a request to and response from the Agency. This should give us a list of all the Agency offices in Mexico. The Airline server asks:

http://www.agency.com:9999/Component/25003[-City]
{www.club.com:9999/MCTY[25002]/Country=
www.agency.com:9999/OFFC[25003]/country}

In one aspect of the system, the data for this request is provided in the data section of the HTTP message (this data is just the list of country names previously obtained; in this case it contains "Mexico"). The Agency server will be able to discover this if the curly braces {0} are constrained to always having data in the query; so if it does not appear as "drag-data" after a "<", it must appear in the data section. This rule allows for complex queries involving a great deal of data.

Again, the syntax "[-City]" means the Agency server will respond with a list of data items, containing the "City" field of the "OFFC" object. The Airline server now has a list of cities, and it can complete the query itself, finding all the flights to all these cities. It can then create an HTML document: a list form for the object "AFLT" (Flights). Finally, it sends this form right back to the browser.

A difficulty arises if one of the participants—say the Resorts system closes off its site (for example with a firewall). The Resorts system may then decide to allow access only to select systems; in our example, this would be the third-party tourist agency. Note that steps 4–5 of the example require the Airline system to send a request to Clubs, and receive a response. If Clubs responds to queries coming only from certain sites, such as the Agency, then these steps fail. One solution is to place a proxy server on the Agency site and have the query go through the Agency proxy to the Clubs.

When the Agency supplies the relation (step 2 of the example), it will supply the proxy-URL instead of the Club URL; so the relation will be {www.clubProxy.com/MCTY[25002]/Country=
www.clubProxy.com/OFFC[25003]/Country & www.agency.com:9999/OFFC[25003]/City=
www.airline.com:9999/AFLT[25001]/City}

As a consequence, when the Airline system needs to query Clubs (steps 4–5), it will send the query to the address www.clubProxy.com. A proxy-server is located at this address, which is part of the Agency site. The proxy-server only takes the request, and sends it to Clubs. Since this request is now coming from the Agency, Clubs accepts it, and sends back the answer. The proxy receives the answers, and sends it right along to Airlines. This extra complication is usually needed only if the direct route has been closed.

FIG. 5(*a*) is a dialog box used in the process of connecting to a remote server to import components. In the dialog box shown in FIG. 5(*b*), the user is prompted for the address (host name or IP number) and port number of the remote host on which the remote server is located, as well as a user name and password for the remote application. The wizard then connects to the remote host.

In the dialog box shown in FIG. 5(*c*), the user can select the component(s) in the remote application to import into the local application. Before completing the correlation process, the user can check the selections. The window of FIG. 5(*d*) displays the name and URL of the remote server to which the user is connected.

Using the present invention, dragged elements and drop targets that belong to completely different computers, data sources and/or organizations can be correlated, so long as a communication network connects them. One may connect completely different systems, with different internal data, processes, software, and hardware and administration schemes, even belonging to entirely different organizations. From a user's point of view, the user simply drags elements onto components and perceives several systems as being seamlessly correlated without change to the user's way of working.

Additionally, the present invention allows for non-centralized administration of the several systems it correlates. Each system may continue to be administered by the organization that owns it; no administration rights need be delegated to any other organization (though they may if desired), and no central authority is required.

Additionally, systems can be correlated with no administration effort at all to the organizations that own them: correlation between two systems may be done by third parties, on separate computers and systems owned by the third-party; or through cooperation between the owning organizations. The choice is made by the organizations.

HRNP Extensions for Correlation

HRNP Links

The following are HRNP links: 10 points

HRNP://modelUrl/Component/ComponentId<modelUrl/Object/Property/value where, modelUrl is a standard DNS hostname & port on systems that have imported "foreign" Components from multiple suppliers, the modelUrl serves to distinguish between Components with the same number or name the combination modelUrl/Component/ComponentId must be unique world-wide Object is a filecode ComponentId is an Component-number appropriate for the filecode; usually the "main" Component, but not always.

Property is a fieldAlias value is the data in the field, from the database

Transport URLs from the Plugin to the "Owner" Server 12 Points

Open/Find/Add/Update operations always go to the server that owns the Component.

When opening an Component by double-clicking on it:

http://modelUrl/HRNP$30000modelUrl/Component/ComponentId

The modelUrl is taken from the "Component URL" column in the Component file

"Open" operations always go to the server that "owns" the Component.

Find/Add/Update operations:

---

A "find" Transport URL
http://modelUrlA/HRNP$30000modelUrlA/Component/ComponentId
    ?Button=Find&
        modelUrlB.ObjectB.PropertyB=valueB&
        modelUrlC.ObjectC.PropertyC=valueC&...

---

Add/update operations: same as Find, but with Button= Add/Update . . .

Find/Add/Update operations always go to the server that "owns" the Component, that is "modelUrlA" (this server is also the one that supplied the Find/Add/Update template, and is the one that understands the relations between the fields in the template).

Transport URLs Involving Relations 12 Points

When dragging an Component (or clicking a link):
http://serverUrl/HRNP$30000modelUrlA,Component/ComponentId <modelUrlB/Object/Property/value
The serverUrl is provided by the "Component file"
serverUrl=modelUrl means that we go to the server that "owns" the Component for the answer;

In addition to the AND ("&") operator, relations can involve all other operators, including parentheses operators Note that the "relation chain" always begins with the source model, and ends with the destination model.

Note that objects involved in the relation need to be fully denoted, including full model-server URLs Note that in the general case, ObjectB2 and ObjectB1 may or may not be the same; the server at modelUrlB must translate from ObjectB1 to ObjectB2 (if necessary) using its internal relations. The same is true for ObjectA2 and the destination object at modelUrlA/Component/ComponentId1

An NDO (Network Data Object) is defined as a list of data items, as follows:

Network Data Objects are a representation of meta data on the network. NDOs contain all the data necessary to interpret the data, including field-names, server-URLs (of the servers that supplied the data) etc. Therefore NDOs contain quadruplets of server-URL, field-name, field-type and field-length, as well as a buffer containing the actual field contents. NDOs are more exactly defined below.

It is also possible to send a relation along with a NDO, in place of the "drag-data":

--- http://serverUrl/HRNP$30000modelUrlA/Component/ComponentId1[-fieldname]
    {modelUrlB/ObjectB[ComponentIdB]/PropB<=>modelUrlX/ObjectX[ComponentIdX]/PropX1 &
    modelUrlX/ObjectX[ComponentIdX]/PropX2<=>modelUrlY/ObjectY[ComponentIdY]/PropY1&
        modelUrlY/ObjectY[ComponentIdY]/PropY2<=>....
        .......<=>modelUrlZ/ObjectZ[ComponentIdZ]/PropZ1 &
    modelUrlZ/ObjectZ[ComponentIdZ]/PropZ2<=>modelUrlA/ObjectA2[ComponentIdA2]/PropA2
    }

--- serverUrl!=modelUrl means that we are going to a third-party server, which will ask the "owner" for help A third-party request for "help" can involve sending a relation in the URL:

http://serverUrl/HRNP$30000modelUrlA/Component/
    ComponentId1   {modelUrlB/ObjectB2
    [ComponentIdB2]/PropB2<=>modelUrlX/ObjectX
    [ComponentIdX]/PropX1 & note the difference between this URL and the "open" URL—here we have the curly brackets {relation}, but no "drag-data"; this serves to tell us this is a query operation with a NDO the NDO should be in the data-section of the HTTP message the NDO is a NDO of a single field:
    modelUrlB/ObjectB[ComponentIdB]/PropB

--- modelUrlX/ObjectX[ComponentIdX]/PropX2<=>modelUrlY/ObjectY[ComponentId]/PropY1&
    modelUrlY/ObjectY[ComponentIdY]/PropY2<=>....
    .
    .
    .......<=>modelUrlZ/ObjectZ[ComponentIdZ]/PropZ1 &
modelUrlZ/ObjectZ[ComponentIdZ]/PropZ2<=>modelUrlA/ObjectA2[ComponentIdA2]/PropA2
}
<modelUrlB/ObjectB1/PropB1/value

---

The "<=>" symbolises any relation, such as "<", "=", ">", "|–" etc etc

The relation would override any A<=>B relation residing on A, B

It is not required that A, B have any A<=>B relation defined "locally"; the relation provided in this Url should be enough to resolve the query the "[-fieldname]" specifies that—instead of the default template—we are simply going to output a NDO with a single field. This syntax can be extended to "[-fieldname1, fieldname2, fieldname3, . . . ]"

It is possible to have more complex relations with several NDOs. A URL for this case may look like this (this is an example with two NDOs):

```
http://serverUrl/HRNP$30000modelUrlA/Component/ComponentId1[-fieldname]
   {
      (modelUrlB/ObjectB[ComponentIdB]/PropB<=>modelUrlY/ObjectY[ComponentIdY]/PropY1 &
         modelUrlY/ObjectY[atmIdY]/PropY2<=>modelUrlA/ObjectA2[ComponentIdA2]/PropA2
      )||
      (modelUrlB/ObjectB[ComponentIdB]/PropB<=>modelUrlZ/ObjectZ[ComponentIdZ]/PropZ1 &
      modelUrlZ/ObjectZ[ComponentIdZ]/PropZ2<=>modelUrlA/ObjectA2[ComponentIdA2]/PropA2
      )
   }
```

Full Formal Syntax of the Transport URL 12 Points

```
http://serverUrl/HRNP$30000modelUrlA/Component/ComponentId1[-fieldname],... fieldnameN]
    {relation}
    <modelUrlB/ObjectB/PropB1/value
relation:=
    modelUrlB/ObjectB2[ComponentIdB2]/PropB2<=>modelUrlX/ObjectX[ComponentIdX]/PropX1 &
    modelUrlX/ObjectX[ComponentIdX]/PropX2<=>modelUrlY/ObjectY[ComponentY]/PropY1&
        modelUrlY/ObjectY[ComponentIdY]/PropY2<=>....
        .
        .
        .......<=>modelUrlZ/ObjectZ[ComponentIdZ]/PropZ1&
    modelUrlZ/ObjectZ[ComponentIdZ]/PropZ2<=>modelUrlA/ObjectA2[ComponentIdA2]/PropA2
    -OR-
    OPER
(modelUrlB/ObjectB2[ComponentIdB2]/PropB2<=>modelUrlX/ObjectX[ComponentX]/PropX1 &
    modelUrlX/ObjectX[ComponentIdX]/PropX2<=>modelUrlY/ObjectY[ComponentIdY]/PropY1&
        modelUrlY/ObjectY[ComponentIdY]/PropY2<=>....
        .
        .
        .......<=>modelUrlZ/ObjectZ[ComponentIdZ]/PropZ1 &
    modelUrlZ/ObjectZ[ComponentIdZ]/PropZ2<=>modelUrlA/ObjectA2[ComponentIdA2]/PropA2
    )OPER
(modelUrlB/ObjectB2[ComponentIdB2]/PropB2<=>modelUrlX/ObjectX[ComponentIdX]/PropX1 &
    modelUrlX/ObjectX[ComponentIdX]/PropX2<=>modelUrlY/ObjectY[ComponentIdY]/PropY1&
        modelUrlY/ObjectY[ComponentIdY]/PropY2<=>....
        .
        .
        .......<=>modelUrlZ/ObjectZ[ComponentIdZ]/PropZ1 &
    modelUrlZ/ObjectZ[ComponentIdZ]/PropZ2<=>modelUrlA/ObjectA2[ComponentIdA2]/PropA2
    )OPER
    .
    .
    .
``` where OPER is a logical operator (and/or/not)

The HTTP Data Section 12 Points

We use the POST method of HTTP for sending long data, such as query-strings and NDOs. This method puts the data in the data-section of the HTTP message (as opposed to GET, where everything must be in the URL).

The data-section may contain:
  a query-string in the HTTP/CGI format, as created by a browser (Netscape/MSIE, for example); or
  a storage section for an HTML document, as expected by a browser (Netscape/MSIE, for example); or
  a storage section for NDOs HTTP/CGI Query-strings, in the Transport URL 12 Points These appear either as a result of pressing a button in a browser, or are created as part of the conversation between correlated HRNP servers (so that one server can ask another to continue a cached query). They may include:
  the desired action (Button=Find/Add/Update)
  information on cached queries
  object-name (either a matrix-name, or the top-level template)
  id
  query-string, in one of two formats:
    Transport URL (without the cgi-signature at the beginning)
    QE format ("DISPLAY FILE FIELD IF . . . ") must be supported for the time being, hopefully we will be able to unify it in time
  position
  previous position
  number of desired rows
  desired operation (previous/next)
  this syntax may also be used for the "first" query—the one that creates the cached query; in this case there are no "id", "query-string" and "previous position"; "desired operation" is next; "position" is 0; and "number of rows" is whatever you want.
  query-conditions, in the format "modelUrl.Object.Property=value"

Storing NDOs in the HTTP Data-section 12 Points

When we use the {relation} syntax without any "drag-data", this implies that the HTTP data-section is storing one or more NDOs. The data section should include:

the number of NDOs stored in it separators between NDOs info on individual NDO

The information for each NDO includes:

the ModelUrl of the server that created the NDO an optional queryId; a unique identifier (per model-server) of the query in the server's cache a list identifying the columns of the NDO, in the format: modelUrlX/ObjectX/PropertyX, modelUrlY/ObjectY/PropertyY, . . .

note that, in general, the model-URLs in this list are identical to the ModelUrl of the server that created the NDO; but in the future, that may change in most cases involving our implementation of relations, there will be a single column only; however in general there may be more the number of rows available the current position (in the query that created the NDO)

the actual data

The present system goes beyond existing distributed data systems in several respects. For example, the present system supports a data navigator interface, a simple and intuitive way to view and navigate between systems; whereas previously one had to construct complicated low level queries on the several systems. The present system also allows each system to be administered separately, whereas previously a distributed data system turned the several systems into one monolithic whole. Furthermore, the correlation of systems may be done by third parties, on separate systems and in separate organizations, without any disturbance or changes to the original systems.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. In a hyper-relational navigation system, a method of responding to a navigation action of dragging a draggable element representing a first component in a first data structure to a drop target representing a second component in a second data structure, comprising the steps of:

identifying the first component from the draggable element; the first data structure residing on a first computer system;

identifying the second component from the drop target, the second component residing on a second computer system communicably coupled to the first computer system;

importing metadata about components in the second data structure into a class-relation matrix maintained for the first data structure; and formulating a response to the navigation action wherein the response is dependent upon at least the first component, the second component and a cell in the class-relation matrix that corresponds to the first and second components and includes imported metadata.

2. In a hyper-relational navigation system having a third party computer remotely coupled to both a first computer system and a second computer system, a method of navigating the first computer system and the second computer system from the third party computer, the method comprising:

dragging a draggable element on the third party computer system, the draggable element representing a first component in a first data structure on the first computer system;

dropping the draggable element on a drop target representing a second component in a second data structure of the second computer system;

identifying the first component from the draggable element;

identifying the second component from the drop target;

importing metadata about components in the second data structure into the first computer system;

setting up relations between the imported metadata and components of the first data structure, wherein the relations are locatable in a class-relation matrix maintained for the first data structure; and formulating a response to the navigation action wherein the response is dependent upon at least the first component, the second component and imported metadata in the class-relation matrix.

3. The method of claim 2 further comprising using the third party computer to administer data stored in the first computer system with data stored in and second computer system.

4. The method of claim 2 further comprising dragging a draggable element representing fourth component in the second data structure;

dropping the draggable element on a drop target representing a fifth component in the first data structure;

importing metadata about components in the first data structure into the class-relation matrix of the second computer system; and formulating a response to the navigation action wherein the response is dependent upon at least the fourth component, the fifth component and imported metadata in the class-relation matrix.

* * * * *